(12) United States Patent
Welker et al.

(10) Patent No.: US 9,423,972 B2
(45) Date of Patent: Aug. 23, 2016

(54) ERROR RECOVERY IN A DATA PROCESSING SYSTEM WHICH IMPLEMENTS PARTIAL WRITES

(71) Applicant: FREESCALE SEMICONDUCTOR, INC., Austin, TX (US)

(72) Inventors: James A. Welker, Leander, TX (US); Jose M. Nunez, Austin, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 99 days.

(21) Appl. No.: 14/543,280

(22) Filed: Nov. 17, 2014

(65) Prior Publication Data

US 2016/0139837 A1    May 19, 2016

(51) Int. Cl.
*G06F 11/00* (2006.01)
*G06F 3/06* (2006.01)
*G06F 11/20* (2006.01)

(52) U.S. Cl.
CPC ............ *G06F 3/0619* (2013.01); *G06F 3/0659* (2013.01); *G06F 3/0673* (2013.01); *G06F 11/2017* (2013.01); *G06F 2201/85* (2013.01)

(58) Field of Classification Search
USPC .......................................................... 714/6.11
See application file for complete search history.

(56) References Cited

U.S. PATENT DOCUMENTS

| | | | |
|---|---|---|---|
| 4,358,848 A | 11/1982 | Patel | |
| 7,185,266 B2 | 2/2007 | Blightman et al. | |
| 2007/0220354 A1* | 9/2007 | Moyer | G06F 11/1052 714/42 |
| 2011/0125961 A1* | 5/2011 | Ding | G06F 12/1027 711/105 |
| 2013/0117641 A1 | 5/2013 | Bains et al. | |

* cited by examiner

*Primary Examiner* — Sarai Butler

(57) ABSTRACT

A data processing system includes a command buffer and control circuitry. The command buffer is configured to store pending write requests to a memory in which each pending write request has corresponding write data. The control circuitry is configured to select a pending write request from an entry of the command buffer and send the selected write request to the memory. The selected write request is a partial write request having first write data stored in the entry. Sending the selected write request includes performing a read-modify-write (RMW), wherein the control circuitry is configured to, after a read operation of the RMW, update the pending write request in the entry from a partial write request to a full write request.

20 Claims, 3 Drawing Sheets

ERROR RECOVERY IN A DATA PROCESSING SYSTEM WHICH IMPLEMENTS PARTIAL WRITES

BACKGROUND

1. Field

This disclosure relates generally to data processing systems, and more specifically, to a error recover in a data processing system which utilizes partial writes.

2. Related Art

In a data processing system, a memory controller typically interfaces between a processor or other module which provides write requests and associated write data and a memory which stores the write data in response to a write request. Errors may occur in the transfer of the write data to the memory. Therefore, the memory typically performs error detection to determine whether an error has occurred, and if an error is detected, an error recovery procedure is performed. In one solution, error recovery includes retrying the failed write request. However, in the case of partial writes performed as read-modify-writes, an error may be present in the data surrounding the desired write location. In this case, the error recovery does not address the corrupted data surrounding the desired write location. Therefore, a need exists for improved error recovery in a data processing system which supports partial writes.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In a data processing system, a memory controller is coupled between a processor or other module which initiates write requests and a memory which stores the write data of the write requests. Pending write requests from the processor or other module are stored in a buffer of the memory controller. The memory controller sends the pending write requests to the memory. Each write sent to the memory requires a minimum amount of data to be written. In embodiment, each write to the memory is performed as a burst write having a burst size. Each write request in the buffer of the memory controller may either be a full write (one which writes a full burst size of data) or a partial write (one which writes less than the burst size of data). In the case of a partial write, the memory controller performs a read-modify-write (RMW) operation. Upon receiving the read data of the RMW operation, the partial write request in the buffer is updated to a full write request in which the write request is updated to include portions of the received read data to complete a burst size of write data. In this manner, when an error occurs with the transfer of write data from the memory controller to the memory, the partial write request can be retried (resent to the memory) as a full write request.

Figure 1:
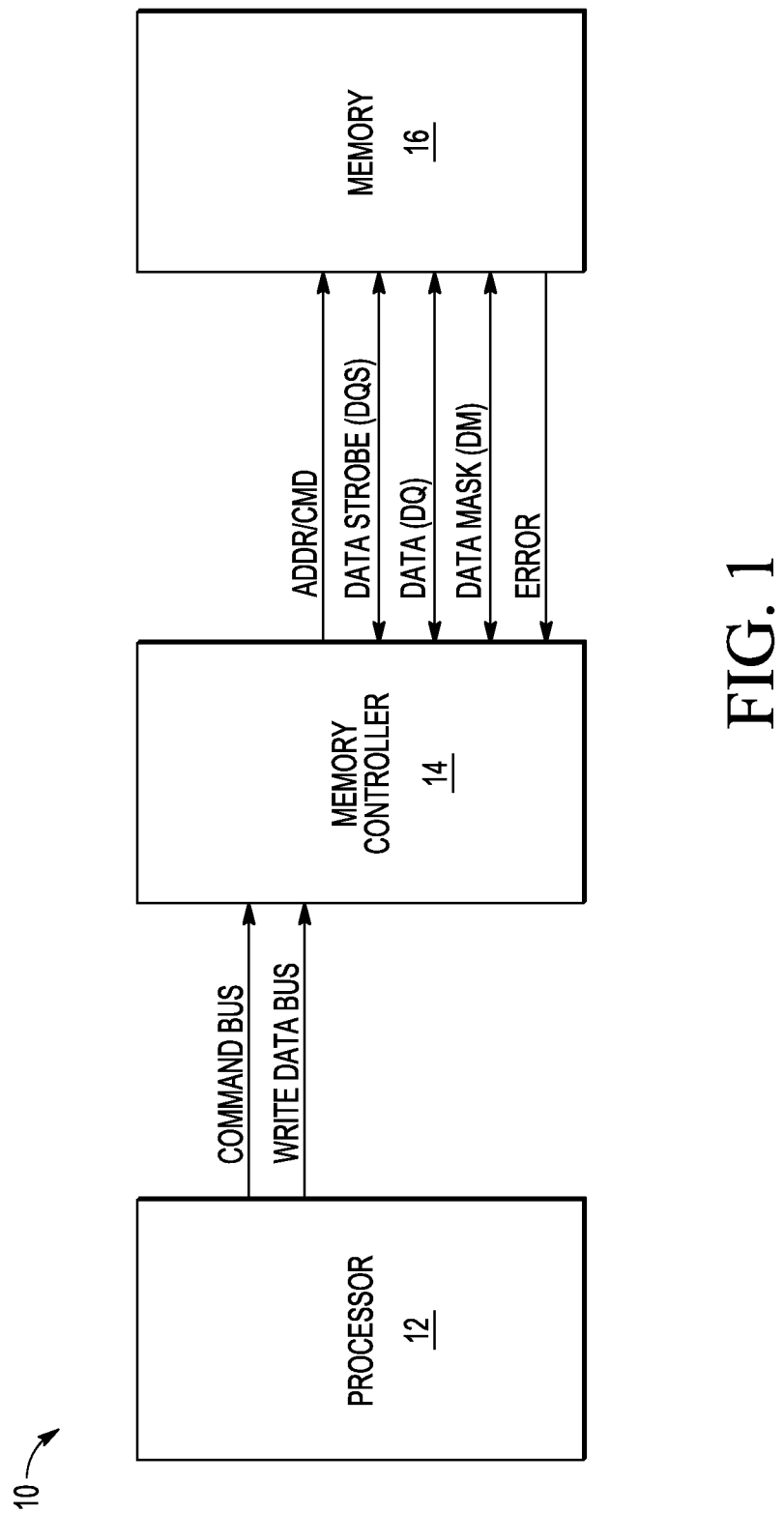
FIG. 1 illustrates, in block diagram form, a data processing system in accordance with one embodiment of the present invention.

FIG. 1 illustrates a data processing system 10 including a processor 12, a memory controller 14, and a memory 16. Processor 12 is coupled to memory controller 14 via a command bus and a write data bus. Memory controller 14 is coupled to memory 16 and provides an address/command (by way of ADDR/CMD) to memory 16 and receives an error indicator from memory 16. A data strobe (DQS) signal, data (DQ), and a data mask (DM) are communicated between memory controller 14 and memory 16.

In operation, processor 12 provides write requests to memory controller 14 for storing write data into memory 16. For each write request, a write command and address location is provided by way of the command bus to memory controller 14. Additional attributes, such as the size of the write data for the write command, may also be provided to memory controller 14 on the command bus as part of the write request. The write data corresponding to a write request is provided to memory controller 14 on the write data bus. Memory controller 14 performs the write requests from processor 12 by providing appropriate addresses and commands to memory 16 by way of ADDR/CMD, and by appropriately toggling DQS and providing the write data as DQ to memory 16. Memory 16 stores the received write data at the indicated address location. Memory 16 also indicates to memory controller 14 whether an error occurred by way of the error signal.

In one embodiment, writes to memory 16 are only performed as burst writes in which, for each burst write, a particular number of data beats (referred to as a burst size) are provided by memory controller 14 to memory 16. In one embodiment, each data beat is a predetermined size and with each data beat of the burst write, memory controller 14 toggles DQS to indicate to memory 16 that a beat is being provided. In the illustrated embodiment, it is assumed that each data beat of a burst write is 8 bytes, and each burst has a burst size of 4 data beats (corresponding to 32 bytes of data). Therefore, in the illustrated embodiment, memory 16 is configured to store a burst size of 4 beats with each burst write. Alternatively, a data beat may include more or fewer bytes, and memory 16 may be configured to store a burst size having more or fewer data beats. A write request which requests storing the full burst size of write data to memory 16 is considered a full write request. A write request which requests storing less than the full burst size of write data is referred to as a partial write request. For example, a partial write request occurs when the write request received from processor 12 is for write data that is less than a full burst size (less than 32 bytes).

For each write request, memory controller 14 generates commands and write data as needed to be provided to memory 16 in order to implement the full and partial writes. For example, for a full write request, memory controller performs a burst write to memory 16 to the indicated address location of the write request. The burst write provides a burst size of write data (4 beats, in the illustrated embodiment) to memory 16. For a partial write request, memory controller 14 may use data masks (if available) or perform a RMW operation.

If data masks are enabled, a partial write of less than the burst size can be performed by memory controller 14 with the use of data masks. In this case, memory controller 14 can provide a data mask along with the burst write command and write data so that memory 16 only stores the write data of the burst write which is not masked by the data mask. The data mask can therefore be used to identify particular beats as well as particular bytes within a beat to be stored. In the case in which data masks are not available, such as when data masking is disabled or when memory 16 is operating in a mode which does not allow data masking, a partial write is performed with a read-modify-write (RMW) operation. For a RMW operation, memory controller 14 first performs a read to read a full burst size of data, then merges the write data for the partial write with the read data, and lastly, performs a full write of the merged data.

Since errors may occur in the interface between memory controller 14 and memory 16, error checking is performed between memory controller 14 and memory 16. Any type of error detection may be performed, such as, for example, Cyclical Redundancy Check (CRC), parity, Error Correction Code (ECC), etc. Memory controller 14 therefore provides an error detection code at the end of each burst write. In the case of CRC, this error detection code corresponds to a checksum value determined by memory controller 14 on the full write data of the burst write (across all beats of the burst write). In the case of ECC, this error detection code corresponds to an ECC syndrome calculated by memory controller 14 across all beats of the burst write. In the case of parity, the error detection code corresponds to one or more parity bits corresponding to all beats or subset of beats of the burst write. Upon receiving a burst write command and the burst write data from memory controller 14, memory 16 determines (i.e. calculates) the error detection code on the received burst write data and compares the determined error detection code with the error detection code received from memory controller 14. If a match occurs, no error is detected, and the error signal remains negated. If a mismatch occurs, an error is detected, and memory 16 asserts the error signal. In response to the error signal, memory controller 14 can initiate an error recovery process. Note that if an error is detected based on an error condition code calculated across all data beats, it is unknown which beat resulted in the error. Also, the error detection is performed at a later time in which additional write commands may already have been provided to memory 16. Therefore, in one embodiment, the error recovery process includes retrying (i.e. resending) any writes which may have resulted in the error. Operation of memory controller 14 and memory 16 will be described in more detail in reference to FIGS. 2-4.

Figure 2:
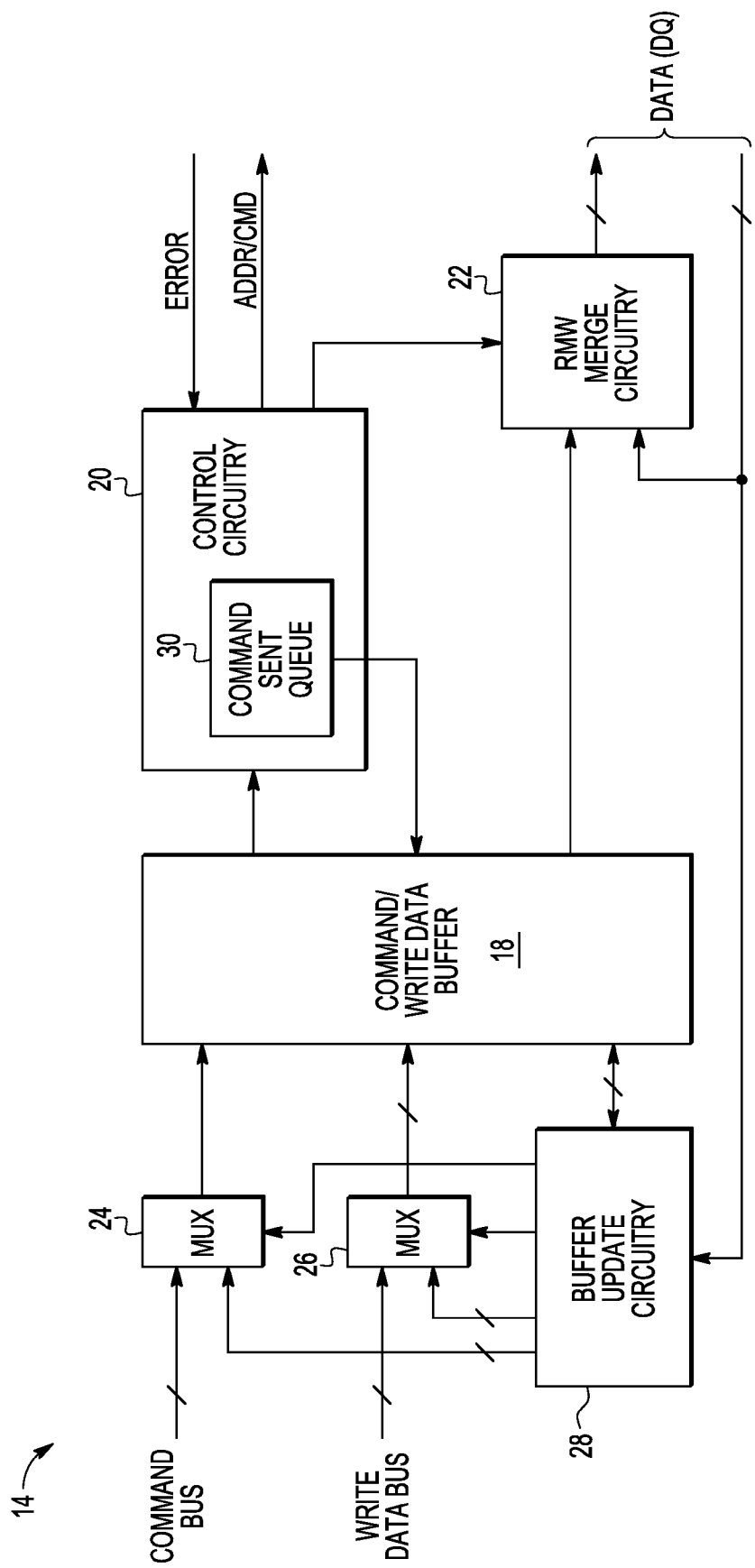
FIG. 2 illustrates, in block diagram form, a memory controller of FIG. 1 in accordance with one embodiment of the present invention.

FIG. 2 illustrates, in block diagram form, memory controller 14 in accordance with one embodiment of the present invention. Memory controller 14 includes a command/write data buffer 18, buffer update circuitry 28, control circuitry 20, RMW merge circuitry 22, and multiplexors (MUXes) 24 and 26. A first data input of MUX 24 is coupled to the command bus, and a second data input of MUX 24 is coupled to buffer update circuitry 28. A first input of MUX 26 is coupled to the write data bus and a second input of MUX 26 is coupled to buffer update circuitry 28. An output of MUX 24 is provided to buffer 18, and an output of MUX 26 is provided to buffer 18. A select input of each of MUX 24 and 26 is coupled to receive a respective select signal from buffer update circuitry 28. Control circuitry 20 is coupled to ADDR/CMD and is coupled to receive the error signal. Control circuitry 20 is coupled to buffer 18 and RMW merge circuitry 22 and includes a command sent queue 30. RMW merge circuitry 22 is coupled to buffer 18, to buffer update circuitry 28, and to DATA (DQ).

In operation, processor 12 provides write requests to memory controller 14 by way of the command bus and write data bus. Buffer update circuitry 28 selects the first data input of each of MUXes 24 and 26 with each incoming write request so that they may be routed to buffer 18 for storage. Buffer 18 includes N entries, in which each entry may store a pending write request received from processor 12. Each entry is configured to store a destination address (addr) in memory 16 of a write request, a size of the write request (in which the size may be provided in number of bytes), a RMW indicator which indicates whether the write request is a full write (in which the RMW indicator is negated) or a partial write (in which the RMW indicator is asserted), the write data corresponding to the write request, a sent flag which indicates whether the write request has been sent to memory 16, and a valid indicator which indicates whether the entry is a valid entry of buffer 18. Each entry can store up to a full burst size of data, which, in the illustrated embodiment, is 4 beats. Also, each entry may store additional attributes, in addition to the size of the burst write and whether the write is a partial or full write. Therefore, for each received write request, buffer update circuitry 28 selects an available entry in buffer 18 and the write request is stored in the available entry. The corresponding valid field of the entry is asserted. Note that if there are no available entries in buffer 18 remaining, a stall will occur so as to prevent overwriting valid data in buffer 18.

Control circuitry 20 selects a pending write request from command/write data buffer 18 to send to memory 16. Therefore, control circuitry 20 provides appropriate commands and information to memory 16 to implement the selected write request. Upon selecting a write request from buffer 18, control circuitry 20 asserts the sent flag of the selected entry in buffer 18, and also places an identifier (e.g. a tag) corresponding to the selected entry into command sent queue 30. Therefore, command sent queue 30 is configured to keep track of which write requests of buffer 18 have been sent to memory 16.

In the case when the selected write request is a full write, such as when the data size of the write request is the burst size of memory 16 (e.g. 4 beats in the current embodiment), control circuitry 20 provides a burst write command and the corresponding write address to memory 16 by way of the ADDR/CMD signals. Control circuitry 20 also provides the corresponding write data, stored with the write request in buffer 18, to memory 16 by way of the DQ signals. With each data beat provided to memory 16, memory controller 14 toggles DQS. In one embodiment, for write data provided from control circuitry 20, each edge of DQS is centered within the corresponding data beat. For example, if a rising edge of DQS is centered within a data beat, a subsequent falling edge of DQS is centered within the subsequent data beat. Control circuitry 20 also determines the error detection code for the write data and provides the error detection code after the final beat of the burst write to memory 16. Memory 16, upon receiving the complete 4 beats of the burst write, determines the error detection code for the received beats and compares the determined error detection code with the received error detection code. If a mismatch occurs, memory 16 asserts the error signal to signal to control circuitry 20 that an error occurred in the data transfer for the burst write. In response to an error occurring, control circuitry 20 implements an error recovery process. If a match occurs, no error is indicated and the error signal remains negated.

The determining of whether or not an error occurred by memory 16 takes time, and therefore, if an error occurs, the error signal is asserted at some time after the burst write data and error detection code was received by memory 16. Therefore, at the time control circuitry 20 receives an asserted error signal, it is unknown when the error occurred, or which data beat transfer resulted in the error, since additional write commands could have been sent by control circuitry 20 to memory 16 prior to assertion of the error signal. In this case, as part of the error recovery process, control circuitry 20 uses the entries in command sent queue 30, which represent those entries which have not yet been completed, to determine which write requests of buffer 18 to retry (i.e. resend to memory 16). Control circuitry 20 updates those entries in buffer 18 which need to be retried by negating the sent flag of the entries.

In one embodiment, control circuitry 20 waits a predetermined window of time upon sending a write request from buffer 18 to memory 16 to determine whether or not an error has occurred. If, within the predetermined window of time (also referred to as an error window) of each write request, the error signal has not been asserted, control circuitry 20 concludes that no error occurred with the data transfer of that write request and thus removes the write request from command sent queue 30. Also, the entry for that write request is removed from buffer 18 by negating the valid field of the entry. In one embodiment, a shift register is used to keep track of elapsed time since each write request is sent to memory 16. In this case, a delay of propagating a bit through the shift register corresponds to the length of the error window. Therefore, each time a write request is sent to memory 16, an asserted bit is shifted into the shift register. If the asserted bit propagates through the entire shift register without the error signal asserted, it is assumed that the corresponding write request completed without error and can be removed from queue 30 and buffer 18. Alternate embodiments may use different methods for keeping track of the error window to determine if a write request should be removed from buffer 18 as having been completed without error.

In the current embodiment, it is assumed that data masks are not available or are not enabled. Therefore, in the case when the selected write request from buffer 18 is a partial write, i.e. when the data size of the write request is less than the burst size of memory 16, control circuitry 20 performs a RMW operation to implement the partial write. As described above, if the write request received from processor 12 is a partial write, the RMW bit of the entry for the write request in buffer 18 is asserted. Operation of a partial write will be described with respect to FIGS. 3 and 4.

Figure 3:
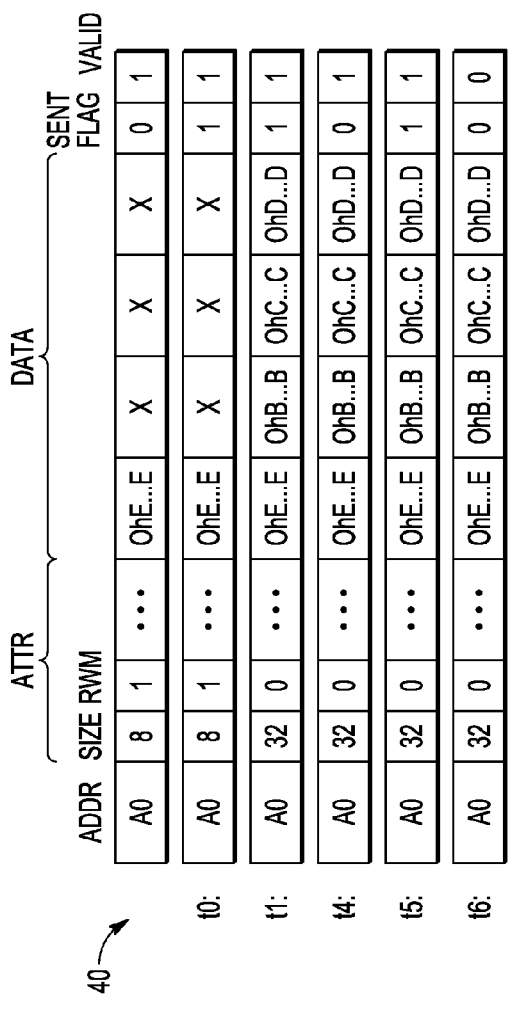
FIG. 3 illustrates, in diagrammatic form, an entry of a command/write data buffer of the memory controller, in accordance with one embodiment of the present invention.

FIG. 3 illustrates an entry 40 of buffer 18 which corresponds to the selected entry which stores a partial write request from processor 12. Upon receiving the partial write request from processor 12, buffer update circuitry 28 stores the partial write request to available entry 40. In entry 40, the destination address of the write request (A0) is stored in the address field, the size of the write request (8 bytes) is stored in the size field, the write data for the partial write request is stored in the data field, and the valid bit is asserted. Since the size of the write is less than the burst size of 4 beats for memory 16, the RMW bit of entry 40 is also asserted to indicate a partial write. In the illustrated embodiment, note that the size field is provided in decimal value, the RMW, sent flag, and valid fields are provided as binary values, and the data is provided as hexadecimal values (as denoted by "0h" preceding the data value). The data field can store up to 4 beats of write data (corresponding to 32 bytes of write data). In the current example, the partial write request stored in entry 40 corresponds to a write of the 8-byte (64-bit) data value 0hE . . . E, which corresponds to 0hEEEEEEEEEEEEEEEE. The remaining fields of the 32-byte write data are denoted as "x" since they are don't care values. That is, since the partial write request is only for 8-bytes, only one field of the write data in entry 40 is needed to store the write data.

Figure 4:
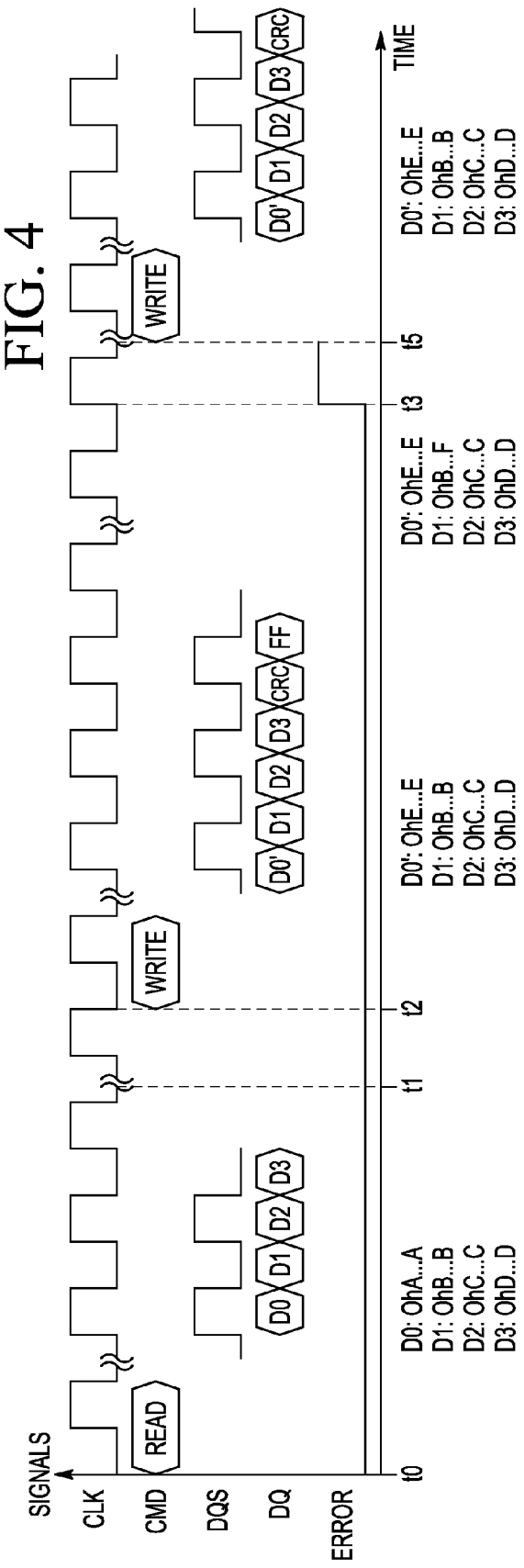
FIG. 4 illustrates a timing diagram of various signals of the memory controller in accordance with an embodiment of the present invention.

FIG. 4 illustrates a timing diagram from the perspective of memory controller 14 which includes the CLK signal, the CMD signal, the DQS signal, the DQ signal, and the error signal. At time t0, control circuitry 20 selects the partial write request in entry 40 to send to memory 16. In doing so, the sent flag bit of entry 40 is asserted, as illustrated in FIG. 3, and an indication of the partial write request (such as a tag identifying entry 40) is stored into command sent queue 30. Since this is a partial write, control circuitry 20 cannot send a write of less than the burst size to memory 16. If control circuitry 20 were to send only the 8-byte data value in entry 40 to memory 16, memory 16 would still perform a write of the full burst size (32-bytes), thus overwriting data in memory locations adjacent to A0 with unknown values. Therefore, memory controller 14 first performs a read command to determine the values stored in the memory locations adjacent to A0. After the read command, memory controller 14 merges the write data value from entry 40 with the received read data (which includes the correct data values adjacent memory location A0). Memory controller 14 then performs a write of the merged data (which is the full burst size). As a result, only the 8-byte data value of A0 is updated without affecting the data in the adjacent address locations.

Therefore, referring to FIG. 4, at time t0, control circuitry 20 sends a read command to memory 16 by way of the ADDR/CMD signal. Note that the address A0 is also sent, although not illustrated in the timing diagram of FIG. 4. Since memory 16 only performs burst operations, the read command is a burst read in which 4 beats of read data is returned by memory 16, starting from address location A0. Still referring to FIG. 4, at some point after the read command is sent, memory controller 14 receives the 4 beats of read data from memory 16. With each beat of read data, memory 16 toggles the DQS signal, in which each data beat provided by way of DQ is aligned to occur between adjacent edges of DQS. Therefore, memory controller 14 receives 4 beats of read data (D0, D1, D2, and D3) in which D0 corresponds to the data currently located at address location A0 in memory 16 and D1-D3 corresponds to data currently located at contiguous address locations subsequent to A0 in memory 16. As indicated below the timing diagram in FIG. 4, D0 (the first beat) of the read data has the data value 0hA . . . A, which corresponds to 0hAAAAAAAAAAAAAAAA. D1 (the second beat) of the read data has the data value 0hB . . . B, which corresponds to 0hBBBBBBBBBBBBBBBB. D2 (the third beat) of the read data has the data value 0hC . . . C, which corresponds to 0hCCCCCCCCCCCCCCCC. D4 (the fourth beat) of the read data has the value of 0hD . . . D, which corresponds to 0hDDDDDDDDDDDDDDDD.

Referring to FIG. 2, the read data is provided to buffer update circuitry 28 and to RMW merge circuitry 22. Upon receiving the read data, buffer update circuitry 28 updates entry 40 in buffer 18 to reflect a full write (with a write size of 32 bytes rather than 8 bytes). Referring to FIG. 3, at time t1, the read data corresponding to D1, D2, and D3 is stored into the remaining fields of the write data in entry 40. Therefore, the write data in entry 40 represents the desired write value for D0 (denoted as D0', and corresponding to 0hE . . . E), and the data values of D1, D2, and D3 (corresponding to 0hB . . . B, 0hC . . . C, and 0hD . . . D) which are located in memory 16 adjacent to A0. Also, since the data adjacent to A0 is known and is now within the write data field of entry 40, the size field of entry 40 is updated to 32 to indicate a write of 32 bytes rather than just 8. The RMW field of entry 40 is negated to indicate that the write request of entry 40 is no longer a partial write request but a full write request. That is, the write request of entry 40 is converted from a partial write request to a full write request, in which the write request is of the burst size of memory 16.

At time t2, control circuitry 20 sends a burst write command to memory 16 and controls RMW merge circuitry 22 such that the read data (D1, D2, and D3) is merged with the desired write value D0' when provided to memory 16. Therefore, at some time after the write command is sent to memory 16, memory controller 14 provides 4 beats of write data to memory 16 (D0', D1, D2, and D3). With each data beat, memory controller 14 toggles DQS such that each edge of DQS is centered within the corresponding data beat. For example, a rising edge of DQS is provided centered with the first beat (D0'), and a subsequent falling edge of DQS is provided centered with the second beat (D1). As indicated below the timing diagram of FIG. 4, D0' corresponds to 0hE . . . E (which is the write value to A0 corresponding to the original partial write request from processor 12), and D1-D3 correspond to 0hB . . . B, 0hC . . . C, and 0hD . . . D, respectively (which are the values adjacent location A0 in memory 16). Control circuitry 20 calculates an error detection code (e.g. a CRC checksum) over the 4 beats of write data and provides the error detection code after the last beat of write data. Control circuitry 20 also provides an end indicator (e.g. 0hFF) to indicate the end of the burst write. In an alternate embodiment, rather than providing an end indicator, the error detection code is provided as the final two beats of the write data.

Upon receiving the 4 beats of write data, memory 16 determines the error detection code over the 4 beats and compares it to the received error detection code. In the illustrated embodiment, the data received for each of D0', D2, D3 at memory 16 is correct. That is, D0' is received as 0hE . . . E, D2 as 0hC . . . C, and D3 as 0hD . . . D. However, D1, which was transmitted from memory controller 14 as 0hB . . . B was received at memory 16 as 0hB . . . F. That is, a bit in the last byte of the data was flipped due to an error. This error may have been caused by the interconnect between memory controller 14 and memory 16 which transmits the write data (in the DQ connection). The last byte of the second beat (D1) was provided as 0hB (corresponding to 0b1011), but was received by memory 16 as 0hF (corresponding to 0b1111) in which the second bit from the left was flipped from its intended value. Therefore, the error detection code provided by memory controller 14, which is determined based on D0'-D3 does not match the error detection code determined by memory 16 based on D0'-D3 because D1 is not correctly received. Therefore, an error is determined and memory 16 asserts the error signal at time t3. Note that with the assertion of the error signal, an error is indicated to memory controller 14, however, no indication is provided as to which data beat or byte within the data beat resulted in the error. Assertion of the error signal only alerts control circuitry 20 to the existence of an error which occurred within a predetermined window of time (i.e. within an error window).

Upon control circuitry 20 receiving the asserted error signal, control circuitry 20 initiates an error recovery process by determining which write requests, using command sent queue 30, to retry. In the current example, the write request of entry 40 needs to be retried since it may have resulted in the error. (Note that upon the assertion of the error signal, control circuitry may not know which sent write command resulted in the error, therefore all write commands within a predetermined window of time are retried.) Therefore, at a time t4, after assertion of the error signal, control circuitry 20 negates the sent flag of entry 40 (as seen in FIG. 3) in buffer 18 and removes the write request of entry 40 from command sent queue 30. In this manner, it can be selected again by control circuitry 20 to be retried. (Note that time t4 occurs at some time between t3 and t5 and is included in FIG. 3, but is not labeled in FIG. 4.)

At time t5, control circuitry 20 again selects the write request of entry 40 to be sent to memory 16. The sent flag is again asserted, as illustrated in FIG. 3, and an indicator of the write request of entry 40 is again stored in command sent queue 30. When the write request of entry 40 is retried, it is now treated as a full write rather than a partial write. Therefore, a write command is sent to memory 16 and the 4 beats of write data from entry 40 (including D0', D1, D2, and D3) are sent to memory 16. In this case, a write operation can be directly performed without needing to perform a read-modify-write operation. An error detection code is also determined and sent by memory controller 14 to memory 16 with the write data. Memory 16 therefore writes the full burst size at address location A0 with the correct data, which includes the desired 8-byte write value of the original partial write request and the adjacent 24-bytes of unchanged values. In this example, it is also assumed that no error resulted from the transfer of the write data. Therefore, after a predetermined window of time has passed without assertion of the error signal, such as at a time t6 (not labeled in FIG. 4), entry 40 is removed from buffer 18 by clearing the sent flag and valid bits of the entry. Entry 40 is now an available entry for a new write request from processor 12. The indicator for the write request of entry 40 is also removed from command sent queue 30.

Note that since entry 40 of buffer 18 was updated to a full write upon performing the RMW operation and now stores the 8-byte write value D0' merged with read data D1-D3, the retry of entry 40 after occurrence of the error at t3 will result in the correct write data being written at location A0, regardless of where the error actually occurred. In the current example, the error occurred in D1, which is not at the location (A0) which was being written to originally with the partial write request from processor 12. Had entry 40 in buffer 18 not been updated to a full write with the full burst size write data, a retry of the partial write of only D0' (which would have to be performed with a read-modify-write operation) would not have addressed the problem with D1, and the bad data would have been rewritten to memory 16. Furthermore, by updating existing entry 40 which was created when the partial write request was originally received from processor 12, separate storage circuitry is not needed to store the updated full write request information upon performing the read-modify-write operation to create the merged data.

Therefore, by now it can be understood how pending partial write requests can be updated to full write requests upon detection of an error such that, during error recovery, a retry of the partial write request can be treated as a full write request. This allows the appropriate burst size of data to be correctly stored in memory 16 when the updated full write request is retried. In this manner, retries of any partial write requests are performed as full writes.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The phrase "0h" preceding a number indicates that the number is represented in its hexadecimal or base sixteen form. The phrase "0b" preceding a number indicates that the number is represented in its binary or base two form.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Also for example, in one embodiment, the illustrated elements of system 10 are circuitry located on a single integrated circuit or within a same device. Alternatively, system 10 may include any number of separate integrated circuits or separate devices interconnected with each other. For example, memory 16 may be located on a same integrated circuit as processor 12 and controller 14 or on a separate integrated circuit.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, pending write requests stored in buffer 18 may be received from any module within system 10 configured to communication with memory controller 14 other than or in addition to processor 12. Also, note that while in the above embodiments 32 bytes was used as a full write and 8 bytes for a partial write, a full write can be more or fewer bytes, depending on the memory's requirements, and a partial write is any write size that is less than a full write. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

One embodiment relates to data processing system including a command buffer configured to store pending write requests to a memory, each pending write request having corresponding write data; and control circuitry configured to select a pending write request from an entry of the command buffer and sending the selected write request to the memory. The selected write request is a partial write request having first write data stored in the entry and sending the selected write request includes performing a read-modify-write (RMW), wherein the control circuitry is configured to, after a read operation of the RMW, update the pending write request in the entry from a partial write request to a full write request. In one aspect of the above embodiment, the control circuitry is configured to store a portion of read data returned from the read operation of the RMW into the entry of the command buffer, wherein the first write data and the portion of the read data together provide write data for the full write request. In a further aspect, the control circuitry is configured to perform the read operation as a burst operation. In another further aspect, the partial write request indicates a first address location in the memory at which to store the first write data, and wherein the portion of the read data corresponds to data stored in the memory at address locations adjacent the first address location. In yet a further aspect, the data processing system further includes RMW merge circuitry configured to, after the read operation of the RMW, merge the first write data with the portion of the read data to form merged write data and to provide the merged write data to the memory for a write operation of the RMW. In yet an even further embodiment, the control circuitry is configured to perform the write operation of the RMW as a burst operation. In another yet even further embodiment, the control circuitry is configured to generate an error detection code using the merged write data and provide the error detection code to the memory. In yet an even further embodiment, the control circuitry is configured to, in response to an error indication from the memory, retry the updated write request stored in the entry. In yet an even further embodiment, the control circuitry is configured to store selected write requests in a sent queue, and in response to the error indication from the memory, retry all write requests stored in the sent queue. In yet an even further embodiment, the control circuitry is configured to retry the updated write request as a full burst write.

Another embodiment relates to a method for error recovery in a memory controller, in which the method includes storing a partial write request for a memory in an entry of a command buffer, the partial write request having corresponding first write data and a corresponding address location, wherein the first write data is less than a burst size of the memory; selecting the partial write request from the command buffer and performing a read-modify-write (RMW) for the partial write request, wherein performing the RMW includes performing a burst read operation to obtain the burst size of read data. The method includes, in response to the burst read operation of the RMW, storing a portion of the read data into the entry of the command buffer with the first write data, and updating the partial write request in the entry to a full write request, wherein the portion of the read data and the first write data together are the burst size of the memory and form full write data for the full write request; and in response to detection of an error by the memory, selecting the full write request from the entry of the command buffer and sending the full write request to the memory as a burst write operation of the full write data. In one aspect, performing the RMW includes merging the first write data with the portion of the read data to form merged write data and performing a burst write operation of the merged write data. In a further aspect, the method further includes generating an error detection code using the merged write data; and providing the error detection code to the memory as part of the burst write operation. In another aspect, the partial write request indicates a first address location in the memory at which to store the first write data, and wherein the portion of the read data corresponds to data stored in the memory at address locations adjacent the first address location. In another aspect, the method further includes, after selecting the partial write request from the command buffer and prior to performing the RMW, storing an identifier of the partial write request to a sent queue and asserting a sent flag in the entry of the command buffer to indicate the partial write request is being performed. In a further aspect, the method further includes, in response to detection of the error by the memory and prior to selecting the full write request, removing the identifier of the partial write request from the sent queue and negating the sent flag in the entry of the command buffer. In yet a further aspect, sending the full response to the memory includes storing an identifier of the full write request to the sent queue and asserting the sent flag of the entry in the command buffer to indicate the full write request is being performed. In yet another aspect, the method includes, if no error is detected by the memory within a predetermined error window, removing the full write request from the entry of the command buffer.

Yet another embodiment relates to a data processing system including a command buffer configured to store pending write requests to a memory having a burst size, each pending write request having corresponding write data; and control circuitry configured to select a pending write request from an entry of the command buffer and sending the selected write request to the memory, wherein the selected write request is a partial write request having first write data stored in the entry that is less than the burst size and sending the selected write request includes performing a read-modify-write (RMW). The control circuitry is configured to, after a burst read operation of the RMW, update the pending write request in the entry from a partial write request to a full write request and store a portion of read data returned from the burst read operation into the entry such that the first write data and the portion of the read data together provide a burst size of write data in the entry for the full write request. In one aspect, the control circuitry is configured to, in response to receiving indication of an error from the memory in which the error prevents completion of the RMW, retry the updated write request stored in the entry as a burst write operation of the burst size of write data stored in the entry.

What is claimed is:

1. A data processing system, comprising:
a command buffer configured to store pending write requests to a memory, each pending write request having corresponding write data; and
control circuitry configured to select a pending write request from an entry of the command buffer and sending the selected write request to the memory, wherein the selected write request is a partial write request having first write data stored in the entry and sending the selected write request includes performing a read-modify-write (RMW), wherein the control circuitry is configured to, after a read operation of the RMW, update the pending write request in the entry from a partial write request to a full write request.

2. The data processing system of claim 1, wherein the control circuitry is configured to store a portion of read data returned from the read operation of the RMW into the entry of the command buffer, wherein the first write data and the portion of the read data together provide write data for the full write request.

3. The data processing system of claim 2, wherein the control circuitry is configured to perform the read operation as a burst operation.

4. The data processing system of claim 2, wherein the partial write request indicates a first address location in the memory at which to store the first write data, and wherein the portion of the read data corresponds to data stored in the memory at address locations adjacent the first address location.

5. The data processing system of claim 4, further comprising RMW merge circuitry configured to, after the read operation of the RMW, merge the first write data with the portion of the read data to form merged write data and to provide the merged write data to the memory for a write operation of the RMW.

6. The data processing system of claim 5, wherein the control circuitry is configured to perform the write operation of the RMW as a burst operation.

7. The data processing system of claim 5, wherein the control circuitry is configured to generate an error detection code using the merged write data and provide the error detection code to the memory.

8. The data processing system of claim 7, wherein the control circuitry is configured to, in response to an error indication from the memory, retry the updated write request stored in the entry.

9. The data processing system of claim 8, wherein the control circuitry is configured to store selected write requests in a sent queue, and in response to the error indication from the memory, retry all write requests stored in the sent queue.

10. The data processing system of claim 8, wherein the control circuitry is configured to retry the updated write request as a full burst write.

11. A method for error recovery in a memory controller, the method comprising:
   storing a partial write request for a memory in an entry of a command buffer, the partial write request having corresponding first write data and a corresponding address location, wherein the first write data is less than a burst size of the memory;
   selecting the partial write request from the command buffer and performing a read-modify-write (RMW) for the partial write request, wherein performing the RMW includes performing a burst read operation to obtain the burst size of read data;
   in response to the burst read operation of the RMW, storing a portion of the read data into the entry of the command buffer with the first write data, and updating the partial write request in the entry to a full write request, wherein the portion of the read data and the first write data together are the burst size of the memory and form full write data for the full write request; and
   in response to detection of an error by the memory, selecting the full write request from the entry of the command buffer and sending the full write request to the memory as a burst write operation of the full write data.

12. The method of claim 11, wherein performing the RMW includes merging the first write data with the portion of the read data to form merged write data and performing a burst write operation of the merged write data.

13. The method of claim 12, further comprising:
   generating an error detection code using the merged write data; and
   providing the error detection code to the memory as part of the burst write operation.

14. The method of claim 11, wherein the partial write request indicates a first address location in the memory at which to store the first write data, and wherein the portion of the read data corresponds to data stored in the memory at address locations adjacent the first address location.

15. The method of claim 11, further comprising:
   after selecting the partial write request from the command buffer and prior to performing the RMW, storing an identifier of the partial write request to a sent queue and asserting a sent flag in the entry of the command buffer to indicate the partial write request is being performed.

16. The method of claim 15, wherein in response to detection of the error by the memory and prior to selecting the full write request, removing the identifier of the partial write request from the sent queue and negating the sent flag in the entry of the command buffer.

17. The method of claim 16, wherein sending the full response to the memory comprises storing an identifier of the full write request to the sent queue and asserting the sent flag of the entry in the command buffer to indicate the full write request is being performed.

18. The method of claim 11, wherein if no error is detected by the memory within a predetermined error window, removing the full write request from the entry of the command buffer.

19. A data processing system, comprising:
   a command buffer configured to store pending write requests to a memory having a burst size, each pending write request having corresponding write data; and
   control circuitry configured to select a pending write request from an entry of the command buffer and sending the selected write request to the memory, wherein the selected write request is a partial write request having first write data stored in the entry that is less than the burst size and sending the selected write request includes performing a read-modify-write (RMW), wherein the control circuitry is configured to, after a burst read operation of the RMW, update the pending write request in the entry from a partial write request to a full write request and store a portion of read data returned from the burst read operation into the entry such that the first write data and the portion of the read data together provide a burst size of write data in the entry for the full write request.

20. The data processing system of claim 19, wherein the control circuitry is configured to, in response to receiving indication of an error from the memory in which the error prevents completion of the RMW, retry the updated write request stored in the entry as a burst write operation of the burst size of write data stored in the entry.

* * * * *